United States Patent [19]

Barrus

[11] 4,444,405
[45] Apr. 24, 1984

[54] ROUGH TERRAIN CART

[76] Inventor: Dwight M. Barrus, 326 Joya Loop, Los Alamos, N. Mex. 87544

[21] Appl. No.: 279,935

[22] Filed: Jul. 2, 1981

[51] Int. Cl.³ .............................................. B62B 1/18
[52] U.S. Cl. ............................... 280/47.3; 280/47.37R; 280/78
[58] Field of Search ............... 280/47.3, 47.32, 78, 280/47.37 C, 47.37 R, 47.22, 47.2, 47.19, 652, 47.25, 47.35, DIG. 6, 289 A, 202, 751; 224/32 R, 32 A

[56] References Cited

U.S. PATENT DOCUMENTS

| | | | |
|---|---|---|---|
| 1,372,538 | 3/1921 | Olson | 280/47.35 |
| 2,416,492 | 2/1947 | Neeley | 280/47.3 |
| 2,429,028 | 10/1947 | Neeley | 280/47.3 |
| 2,598,682 | 6/1952 | Giovannoni | 280/14 |
| 2,711,027 | 6/1955 | Williamson | 280/DIG. 6 |
| 2,715,030 | 8/1955 | Peterson | 280/30 |
| 2,918,296 | 12/1959 | Goodale | 280/41 |
| 2,979,338 | 4/1961 | Dwyer | 280/47.3 |
| 3,034,801 | 5/1962 | Huston | 280/37 |
| 3,199,891 | 8/1965 | Grable et al. | 280/47.31 |
| 3,236,537 | 2/1966 | Eckman | 280/47.18 |
| 3,820,807 | 6/1974 | Curran | 280/47.3 |
| 3,998,490 | 12/1976 | Lallave | 280/47.35 |
| 4,055,354 | 10/1977 | Sharpe | 280/47.31 |
| 4,063,744 | 12/1977 | Fraser | 280/47.37 R |
| 4,296,878 | 10/1981 | Ward et al. | 224/32 A |

Primary Examiner—David M. Mitchell
Attorney, Agent, or Firm—Paul D. Gaetjens

[57] ABSTRACT

A cart for one or two hikers to transport their backpacks and having a single pneumatic tire mounted on a wheel with a double elongated aluminum tubular frame including support braces and rubber padded angular pack brackets enclosing the wheel. Easily adjustable and removable front and rear pairs of handles permit the hikers to direct, propel, and balance the cart, allow infants' seats to be attached thereto, and to store or transport the cart. The wheel is spring-mounted to the frame by means of double concentric steel tubes, the outer one containing a compression spring. A stretched nylon mesh covers the frame to keep pack straps from interfering with the wheel. An accurate mileage counter is mounted to the load angular bracket and belt-connected to the hub of the wheel.

4 Claims, 5 Drawing Figures

ROUGH TERRAIN CART

BACKGROUND OF THE INVENTION

1. Field of the Invention

The present invention relates to a cart, and more particularly to a cart that is intended for use in hiking, camping, and the like, to facilitate the transportation of heavy backpacks on narrow trails and over rough terrain. This cart provides a degree of maneuverability, balance, and ease of use heretofore unattainable. The popularity of hiking and camping and the availability of backpacks for enhancing the comfort of trips into the mountains and other recreational areas emphasize the problems of transporting supplies into remote areas over narrow trails and rough terrain. The common practice is to carry all such supplies in backpacks, and these backpacks have been been improved to the extent that they support larger loads and are organized to carry the essentials for camping. However, the weight of the supplies supported by the hikers is burdensome and constitutes a restriction on the distances which can be traveled in a given period of time.

2. Prior Art

U.S. Pat. No. 4,055,354. This patent discloses a cart for two hikers to transport a load which includes a single wheel with elongate frame disposed directly over the wheel. Braces supporting the frame on the wheel extend closely adjacent to the wheel to minimize the width. A pair of U-shaped handle bars are mounted at opposite ends of the elongate frame so that two persons can direct and propel the wheel with its load supporting frame. A pair of containers, in this case, open end mesh baskets, are hooked over the frame on opposite sides of the wheel for containing the load. With this arrangement, the load is balanced and the containers extend down alongside the wheel so as to lower the center of gravity. The frame members are interconnected by nuts and bolts so that the entire device can be disassembled to a compact shape.

By way of fundamental improvement, the cart of this current invention has continuously incremental adjustment positions for the height of each handle. Further, a unique suspension system is mounted between the wheel and the frame to cushion the shock to the cart, its load, and the operators.

OBJECTS OF THE INVENTION

It is therefore an object of this invention to provide a cart that is capable of carrying two fully loaded backpacks and two infants up to a capacity of 300 pounds.

It is another object of this invention to provide an ultra-light cart design that weighs less than 17 pounds.

It is a further object of this invention to provide a unique spring cushioned ride which allows the safe carrying of fragile equipment or infants, and reduces the stress on the cart frame and cart operators.

It is a still further object of this invention to provide a cart that can be disassembled in a compact manner for storage or transportation.

It is still another object of this invention to provide an adjustable handle-height mechanism for maximum walking comfort of the operators.

Another object of this invention is to provide cushioning means to avoid cart and backpack wear.

Further objects and advantages are to provide improved elements and arrangements in a device for the purposes described which are dependable, economical, lightweight, durable, and fully effective in accomplishing its intended purposes.

SUMMARY OF THE INVENTION

In accordance with this invention, a one- or two-person rough terrain pack cart is built around a single wheel; and, in typical operation, one person walks behind the cart pushing and balancing, and the second person walks in front pulling and balancing. The cart supports the entire weight of the load and, for one-person operation, the forward set of handles can be easily removed. Loads are carried on each side of the wheel up to a total of 300 pounds by simply strapping the backpacks to the cart. The central frame of the cart is made of rigidly welded aluminum alloy tubes so as to provide for maximum strength with minimum weight. The wheel of the cart is also a high-strength aluminum alloy similar to that found on the best quality lightweight bicycle. Bent tubular aluminum alloy handles are mounted in a special split-type clamp which permits easy and quick adjustment of the handle height by pivotal rotation inside the clamp so as to provide the most natural and comfortable grip positions in operation of the cart. This type of clamp for the handles avoids bolt holes which would weaken the tubular handles and also provides an easy method to remove the handles for compact storage or transportation. By simply lowering one set of handles to the ground, a stable three-point configuration holds the loaded cart upright during rest stops. The cart uses an enclosed spring suspension system in which one tube compresses a die spring within a larger tube which reduces wear of the suspension system by shielding it from abrasive dust. This suspension system eliminates damage to fragile load contents and adds long life to the lightweight frame of the cart. The spring action of this system allows bouncing over numerous trail obstacles and also reduces shock stress to the operators' arms. Miles traveled are measured precisely to one one-thousandth of a mile by an industrial quality revolution counter that is belt-driven and connected to the wheel of the cart. Such a mileage counter indicates how far one has come and therefore can greatly aid to show where one is along the trail. An adjustable infant's seat made of durable, lightweight nylon fabric and which is foam-cushioned can be attached and suspended between each set of handles. This allows the operators to take infant children along on a trip.

DETAILED DESCRIPTION OF THE INVENTION

Figure 1:
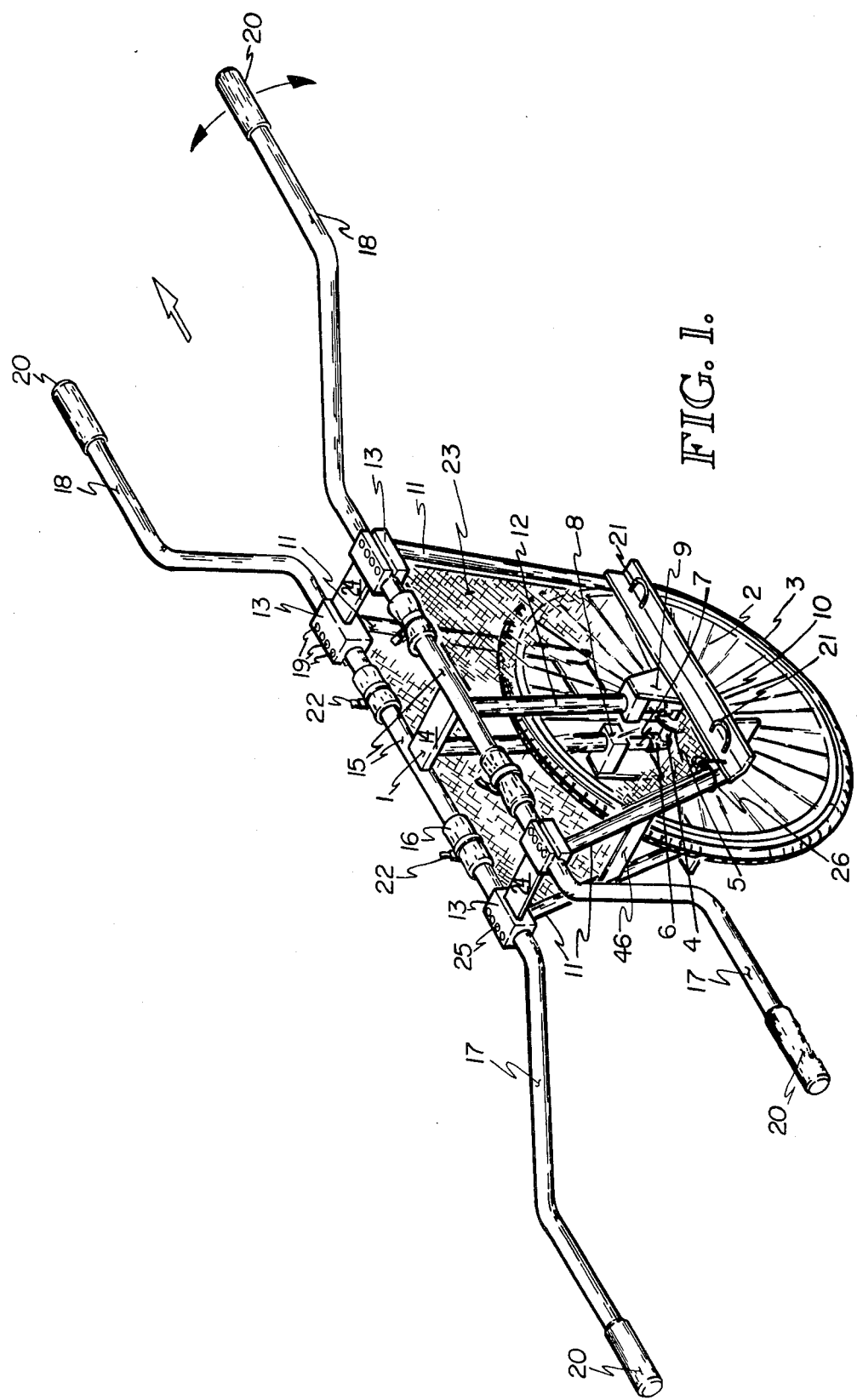
FIG. 1 is a perspective view of the cart fully assembled and ready for operation with the exception that no infant seat or backpacks are shown for clarity.

FIG. 1 is a perspective drawing of the device of this invention. In particular, this drawing shows a primitive terrain pack cart 1 having an aluminum alloy rim and hub on a racing-type bicycle wheel 2 on which is mounted a clincher-type high pressure tube and tire 3; said hub has a pulley 5 attached. A unique suspension system 40 (see FIG. 4) supports a steel yoke 6 attached to a sliding steel yoke tube 7 which passes through aluminum alloy support block 8 to which is welded a trapezoidal gusset 9 that supports aluminum alloy angle bracket shelf 10 which is also welded to angular frame tubes 11. Angular frame tube side spacer bar 46 provides added rigidity to the cart frame, especially when the wheel is removed for repair or to make the cart more compact when being stored or transported. Within the support block 8, aluminum alloy vertical frame tubes 12 terminate one quarter-inch above the bottom of the said support block 8. All angular frame tubes 11 terminate at their upper end in handle clamps 13 while vertical frame tubes 12 are welded to a central spacer bar 14. The central spacer bar 14 is welded to two aluminum alloy horizontal frame tubes 15 on which foam rubber tube pads 16 are secured. The handle clamps 13 are welded to the ends of the horizontal frame tubes 15. The clamps 13 are separated by end spacer bars 24 that are welded between and to each pair of clamps 13. The two pairs, front and rear handles 17 and 18 respectively, are secured in the clamps 13 by three clamping screws 19. The front handles 17 (see arrow) are typically longer so that cart 1 does not interfere with the front operator. Handle grips 20 made from foam-like vinyl provide a non-slip surface for good gripping and comfort. Nylon ropes 21 are attached to angle bracket shelf 10 through holes to secure commercial backpacks (shown in FIG. 2), along with nylon straps 22. Nylon cap mesh 23 is attached at the four corners of the angular frame tubes 11 by elastic cord 26 through holes in the cap mesh reinforced with brass grommets. The mesh keeps the straps of the packs from interfering with the spokes of the wheel. Speader screw 25 opens the clamp blocks to allow insertion of the handles 17 and 18 without the problems of metallic galling and allows easy assembly and disassembly of the handles from the cart 1.

Figure 2:
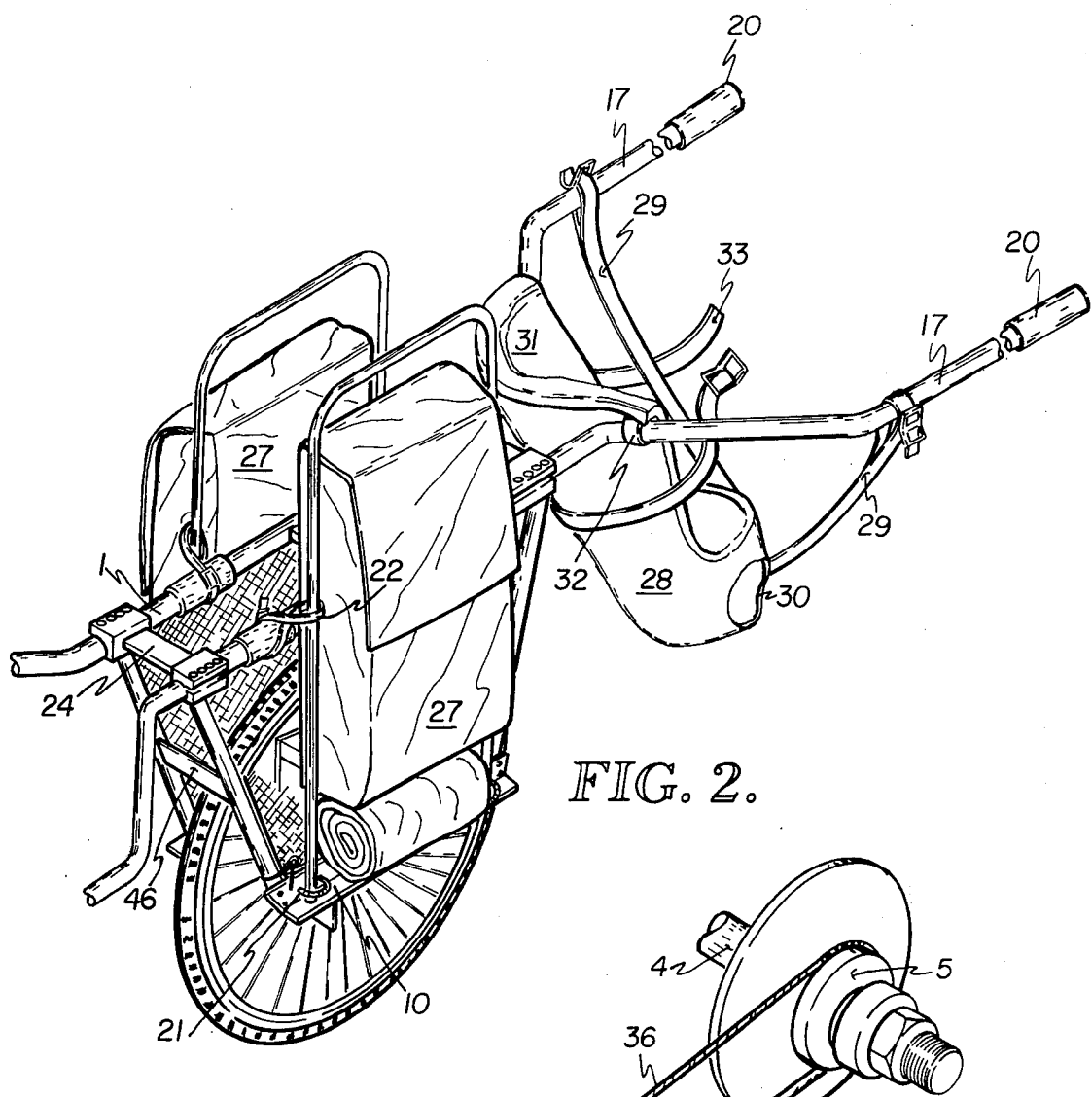
FIG. 2 is a partial perspective view of the cart fully assembled with backpacks and one infant seat attached.

FIG. 2 shows the rough terrain cart 1 with commercial backpacks 27 secured by nylon rope 21 and strap 22 to the angle bracket shelf 10 and horizontal frame tubes respectively. Infant seat 28 may be attached to front 17 or rear 18 handles or both (here shown attached to the front handles 17) by means of sling straps 29 which extend from the seat bottom 30 to a position near the handle grips 20. The seat back 31 is attached to the handle 17 by seat straps 32 and support straps (not shown) to the end spacer bar 24. A chest strap 33 goes around the mid-point of the infant seat 28 and provides added protection in keeping the infant from falling forward.

Figure 3:
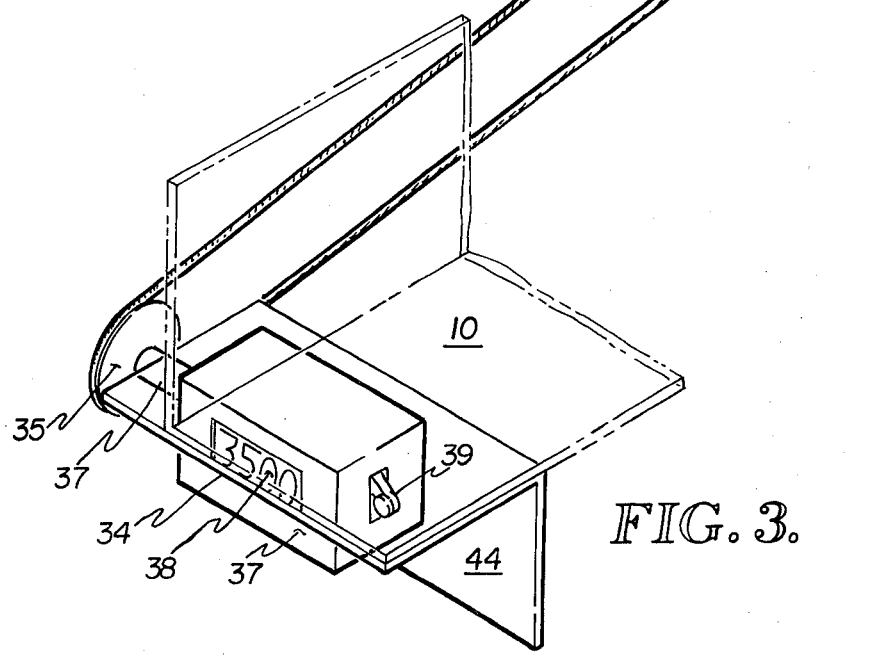
FIG. 3 is an enlarged view of a commercial mileage counter, its mounting, and the belt drive mechanism between the hub of the wheel and the counter.

FIG. 3 shows in detail the mileage measurement system 34 consisting of wheel pulley 5 mounted on the wheel hub and counter pulley 35 connected by an O-ring drive belt 36 which rotates the shaft of a revolution counter 37 having a mileage readout window 38 and reset knob 39. The counter 37 is bolt-mounted on aluminum alloy counter bracket 44 which is bolt-mounted to angle bracket shelf 10.

Figure 4:
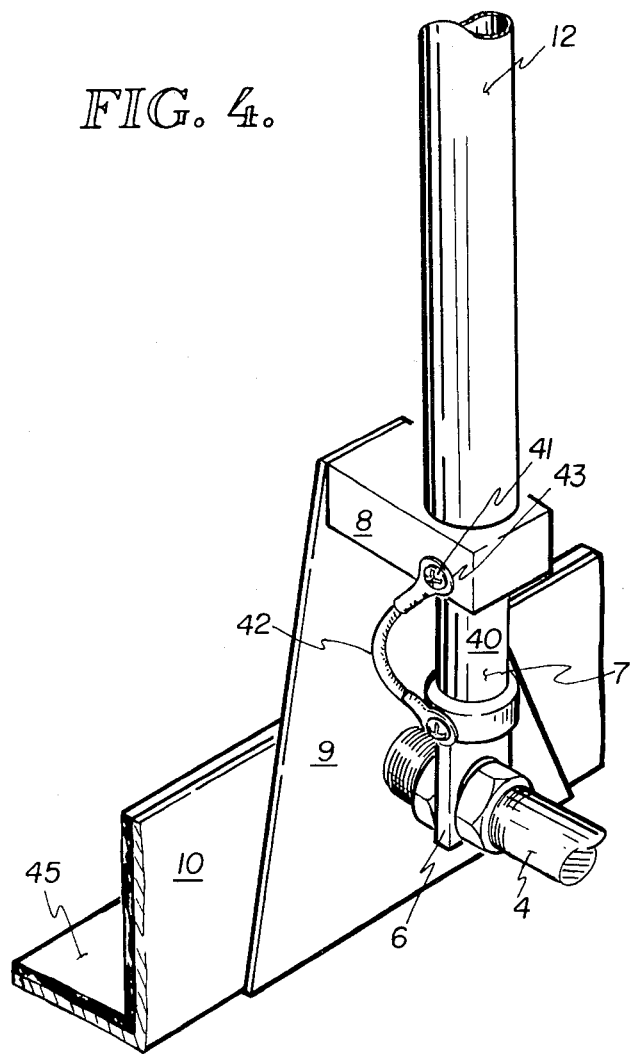
FIG. 4 is an enlarged perspective view of one of the suspension systems that connects to the axle of the wheel.

FIG. 4 is a perspective view of the unique suspension system 40 used in this invention. Axle 4 engages yoke 6 which is press fitted to yoke tube 7 which slides inside of spring housing tube 51 (shown in FIG. 5) which is located inside of vertical frame tube 12 and support block 8. Nylon cord 42 is secured at one end to support block 8 by crimped electrical terminal 43 and metal screw 41, and similarly at the other end to yoke 6. Trapezoidal gusset 9 is welded to support block 8 and to angle bracket shelf 10 which has an adhesive layer to attach rubber strip 45 that protects the backpack and cart from being worn because of rubbing.

Figure 5:
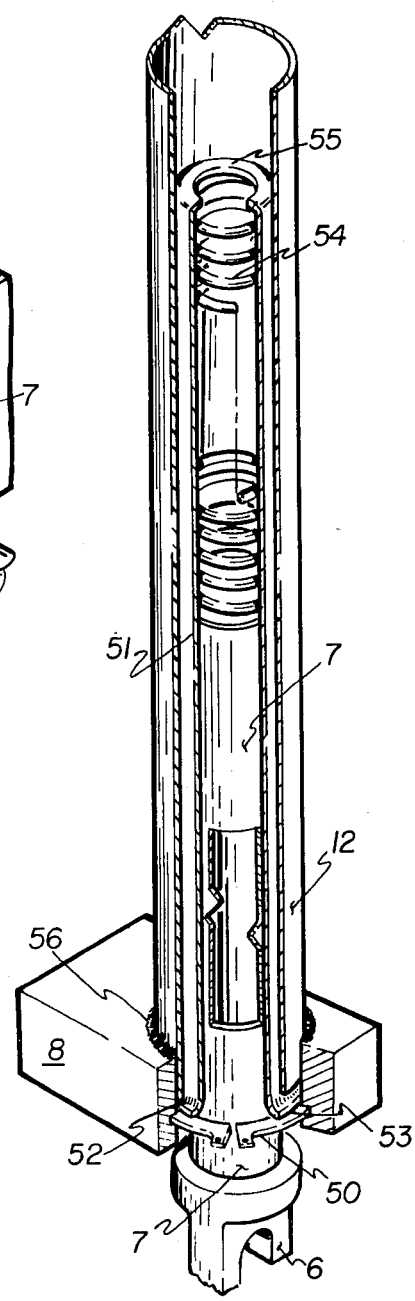
FIG. 5 is a partial cross-sectional view of the suspension system of FIG. 4.

FIG. 5 is a partial cross-sectional view of a three-tube suspension system 40 of FIG. 4. Steel yoke 6 is press fitted into steel yoke tube 7. Support block 8 has a groove for holding a steel retaining ring 50 which prevents the spring housing tube 51 from moving down. The spring housing tube 51 has a swaged flared end 53 so as to rest on retainer ring 50. Vertical frame tube 12 and support block 8 are welded together at point 56, thus carrying the load of both the packs and the stress of the wheel. Vertical frame tube 12 provides a shoulder 52 which supports the stress transmitted by the wheel to yoke 6, yoke tube 7, spring 54, spring housing tube 51, and flared end 53. The spring housing tube 51 is swaged to a smaller diameter at its upper terminal 55 to form a load bearing surface for the spring 54 to compress against. Vertical frame tube 12 is welded to the central spacer bar 14 which is welded to the horizontal frame tubes 15 (see FIG. 1).

OPERATION

When the cart 1 is disassembled, it consists of two major components; namely, the handles 17, 18 and the main frame of the cart. No further disassembly is normally required for transporting or storing the cart because the cart in this condition is compact and easy to handle by one person. All clamping screws 19 and spreader screws 25 are of the socket head cap screw type so that a single size lightweight hex key wrench is the only tool needed to tighten or loosen them. In preparing the cart for trail use, loosen clamping screws 19, tighten spreader screw 25 to open clamp 13 sufficiently to insert the handle end easily into the clamp 13. The handles 17 and 18 are rotated to the particular height desired by the operators. The spreader screw 25 is loosened, and clamping screws 19 are tighetned to secure the handles 17 and 18. The cart is now ready for use.

The cart is a one- or two-person rough terrain pack cart built around a single wheel. The cart has four handles in two matched pairs, front 17 and rear 18. In operation, one person walks behind the cart pushing and balancing; the second person walks in front of the cart pulling and balancing. Loads are carried on each side of the wheel or on top of the cart frame. Typical loads include self-contained carriers, backpacks 27, that are tied on or strapped onto the cart frame. In order to provide ample brush and obstacle clearance, no portion of the load is intended to extend below the height of the wheel axle. Lightness of weight is essential throughout the cart design in order to minimize effort required to move the cart up inclined trails and maximize payload carrying capacity.

The cart of this invention is a rough terrain pack cart which incorporates in combination the following four critical features:

I. Bent tubular aluminum alloy handles 17, 18 are mounted in a special split-type tubing clamp 13. The mounting scheme permits simple pivotal adjustment of handle height to match all sizes of persons for the most natural and comfortable arm positions in walking with the pack cart. This attachment technique provides the further advantage of being ideal for thin wall aluminum alloy tubing since it does not weaken the tubing at the most critically stressed areas such as welding or drilling of fastener holes would do. All handles 17, 18 can be readily removed to meet compact storage and transportation requirements. Rotational pivot of a handle in the split clamp 13 provides continuously incremental height adjustment of either pair of handles independently of the other pair. This allows the human operators to extend their arms to the most comfortable natural positions for balancing the cart and for providing the small lift required to negotiate obstacles. At rest, with either pair of handle ends lowered to the ground, a stable three-point configuration is provided with the two handle ends and the wheel on the ground. The stationary cart is thus self-supporting. This makes the frequently required rest stops in rough country more restful. A lightweight child's seat 28 can be installed between the handles where they join the frame. Thus, two infants or young children can be carried securely with little added burden. To carry infants in addition to a backpack on the back is a formidable task.

II. A spring-cushioned ride for the load is provided by means of an enclosed, contained suspension system 40 consisting of three concentric tubes 7, 51, 12, and wherein the first tube 7 fits closely inside a second tube 51 providing the housing for the spring. The third tube 12 is welded to the support block 8 and to the central spacer bar 14. The first tube 7 mounts to the wheel axle 4 via yoke 6; the second tube 51 provides the housing for the die compression spring 54 and acts as a bushing for the first tube 7; and the third tube 12 is a frame member of the cart. This tubular design is consistent with lightweight necessity and reduces wear to the moving parts by protecting them from the abrasive dust of the operating environment. Such suspension cushioning virtually eliminates damage to fragile load contents caused by rough trails or off trail use. It also greatly reduces shock and vibrational stress that would otherwise be transmitted to the ultra-lightweight welded aluminum alloy frame. Thus, the cart operating lifetime is extended beyond normal hard use fatigue limits while providing a frame design of the lightest practical construction. A further advantage of the spring-cushioned ride is that it greatly facilitates negotiating the numerous obstacles that all forest trails provide. This is so because the spring action permits the cart to partially bounce over obstacles, thereby considerably reducing the effort required by the operators in lifting the cart over obstacles. Spring loading also reduces stress shocks on the operators' arms.

III. The framework is a completely welded rigid structure of thin-wall aluminum alloy tubing and other aluminum alloy forms (bar, plate, and angle). Such a structure optimizes lightness of weight with the essential quality of high strength. The framework configuration is sufficiently narrow to allow compact storage and transportation. Collapsibility of the central framework is both unnecessary and undesirable since the drilling of holes and other means of mechanical attachment would grossly weaken a frame of ultra-lightweight aluminum alloy tubing construction. The self-contained loads (tied or strapped on, rather than carried in a container vessel) are readily removable and can be carried in the traditional manner (on the operators' backs) to clear unreasonably rough terrain (e.g., cliffs or boulder fields). The lightness of the unloaded cart without the added weight of the usual shallow box body or other mechanical means of payload containment adds nearly negligible burden beyond that normally imposed in carrying a backpack on the back. The single wheel 2 and simple see-through frame construction allows the operator at the rear to see obstacles appoached by the wheel and guide around or lift over them. The framework is designed so that the structural members serve dual purposes of holding the cart together, housing the spring-suspension mechanism 40, and providing angle bracket shelf 10 to support the bottom frame ends of commercial backpacks 27. The loads are thereby carried on either side of the wheel in a naturally balanced manner with the lowest practical center of gravity. No additional structural members are required to contain the loads. They are simply strapped 22 or tied to the structural members of the cart frame. Again, this optimizes lightness of weight while not comprising strength of structure.

IV. Mileage traveled is both precisely and accurately measured by a lightweight and compact technique that adds negligible frictional torque in turning the wheel. Such mileage measurement provides a substantial advantage in the use of a pack cart. It greatly helps persons keep track of where they are and how far they have left to walk, exactly analogous to the odometer in an automobile. This is highly beneficial for daily planning of pack trips; and especially in the case of emergencies in the wilderness, it is essential to know how far one must go for help. In practice, the mileage readout 38 adds significantly to peace of mind that the large effort required in wilderness trekking has in fact accomplished a tangible goal. Accurate measurement of mileage along forest trails can also be of significant value to the U.S. Forest Service in determining correct distances for printing on forest signs. The mechanism for determining mileage uses two small aluminum alloy pulleys 5, 35 connected by an O-ring drive belt 36. One pulley 5 is fastened rigidly to the hub of the bicycle wheel. The other 35 is bolted by means of a set screw to the shaft of a commercial revolution counter 37. A mounting bracket 44 serves to hold the counter 37 to the frame angle bracket shelf 10 and to protect it from damage by rocks or branches. The sizes of the pulleys are calculated to produce one full revolution of the counter 37 (thereby one count) for exactly 1/1000 of a mile traveled by the wheel 2. Thus, the mileage readout is precise to thousandths of a mile rather than tenths, as is customary on automotive odometers. This scheme for measuring mileage is lighter in weight than others such as bicycle-type speedometers. It is also more accurate since the counter 37 can be calibrated for direct mileage readout from any wheel simply by properly matching the sizes of the pulleys used with the drive belt 36.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A lightweight rough terrain cart for carrying backpacks, camp gear, and infants comprising in combination:

a. a single wheel, b. a rigid, noncollapsible frame means that encloses said wheel to about its axle and provides mounting for the wheel and the load carried by the cart, c. an elastically deformable suspension system means connected to the axle and partially contained within a vertical frame tube, and d. a continuous and independent pivotal height adjustable handle means connected to each end of a horizontal frame tube, and said handle means comprising a split clamp having a precision contoured surface that grips and locks an aluminum alloy, bent, thin-walled tube handle, said clamp having multiple adjusting screws that fit the clamping surface to the tube handle, and a spreader screw which opens or closes the clamp.

2. The cart of claim 1 in which the frame means comprises:

a. two parallel vertical aluminum alloy frame tubes adjacent to the wheel, each tube being rigidly connected to a support block and to a central aluminum spacer bar, b. dual, elongated horizontal frame tubes disposed symmetrically over the wheel, and c. four angular frame tubes which are rigidly connected to angle load brackets positioned on each side of the wheel and to side spacer bars.

3. The cart of claim 1 in which the suspension system means comprises:

a. a metal yoke fitted to a metal tube which passes through a support block and rests against a die compression spring, b. the support block is connected to each of the vertical frame tubes which terminate within said block, c. a metal spring housing tube containing said die compression spring, said tube having a flared end that rests between a retainer ring and a vertical frame tube shoulder within said block and is swaged at its upper end so as to form a load bearing surface for said spring, and d. a cord secured to the said block and to the metal yoke so as to limit the movement of said yoke.

4. The cart of claim 3 further comprising at least two tubular foam pads attached to each horizontal frame tube which provide a cushion for the shock of heavy loads.

* * * * *